United States Patent [19]

Ichinohe

[11] Patent Number: 4,663,901

[45] Date of Patent: May 12, 1987

[54] GLASS PANE HOLDER FOR WINDOW REGULATOR

[75] Inventor: Kazuhiro Ichinohe, Kanagawa, Japan

[73] Assignee: Hori Glass Co., Ltd., Kanagawa, Japan

[21] Appl. No.: 900,404

[22] Filed: Aug. 26, 1986

[30] Foreign Application Priority Data

Aug. 26, 1985 [JP] Japan ................. 60-186986

[51] Int. Cl.⁴ .................. E05F 11/44; E04C 2/38
[52] U.S. Cl. ...................... 52/127.3; 24/304;
49/351; 49/375; 52/421; 52/441; 52/716;
52/823
[58] Field of Search ............ 52/127.3, 127.4, 421,
52/441, 716, 823; 49/351, 375; 24/304

[56] References Cited

U.S. PATENT DOCUMENTS

| | | | |
|---|---|---|---|
| 1,274,455 | 8/1918 | Rook, Jr. ................ | 52/421 |
| 2,562,489 | 7/1951 | Gallagher ............... | 52/823 X |
| 3,061,895 | 11/1962 | Kleinhans ............... | 52/823 X |
| 3,401,486 | 9/1968 | Adell ..................... | 52/823 X |
| 4,026,088 | 5/1977 | Akabane ................. | 52/716 |
| 4,477,507 | 10/1984 | Kunert ................... | 52/716 X |

FOREIGN PATENT DOCUMENTS

| | | | |
|---|---|---|---|
| 121291 | 4/1946 | Australia ................. | 52/823 |
| 418 | 1/1983 | Japan ..................... | 49/351 |

*Primary Examiner*—Alfred C. Perham
*Attorney, Agent, or Firm*—Bruce L. Adams; Robert E. Burns; Emmanuel J. Lobato

[57] ABSTRACT

A glass holder provided with a pair of opposed side walls and a bottom which define an open-ended slot for receiving an end of a glass pane. The opposed side walls include a piston in engagement with an anti-flow member inserted into the slot so as to function as a dam for closing at least one end of the lost, and the bottom has a hole having a volume enough to receive the anti-flow member. When the holder is mounted on the glass pane, the anti-flow member is attached within the slot whereby an unhardened fluid adhesive filled within the slot is retained within the slot by the anti-flow member to prevent useless protuberances resulting from the outflow adhesive from being formed. As the glass pane is inserted into the slot, the anti-flow member is escaped into the hole.

3 Claims, 5 Drawing Figures

4,663,901

GLASS PANE HOLDER FOR WINDOW REGULATOR

FIELD AND BACKGROUND OF THE INVENTION

The present invention relates to a window regulator for vehicles, and more specifically, to a glass pane holder for connecting a regulator mechanism and a glass pane together.

U.S. Pat. Nos. 4,026,088 and 4,449,326 own by the same assignee as that of the present application disclose the most standard conventional glass pane holders. This glass pane holder is provided with a frame work formed of a hard synthetic resin, the frame work including a pair or opposed side walls and a bottom, the side walls defining a slot therebetween to receive the end of the glass pane. In the aforesaid U.S. Pat. No. 4,026,088, at least both ends of the slot are provided with ribs protruded from the opposed side walls into the slot. These ribs have surfaces snugly disposed on the glass pane to be received in the slot, and as a result, there is created a clearance between the side walls and the glass plane to receive an adhesive.

Mounting of the holder on the glass pane is accomplished by filling the slot of the holder with a sufficient quantity of adhesives and subsequently inserting the glass pane into the slot. In this case, the glass pane is relatively moved from the top of the slot toward the bottom to introduce the adhesives filled in the slot to the clearance formed between the glass pane and the side walls. However, a part of the adhesives is extruded from the opposite ends of the slot to the exterior to form useless rises such as burr. In the prior art glass pane holder, formation of such useless rises merely brings forth a disadvantage to such an extent as to involve waste of adhesives. However, in a newly proposed glass pane holder, this leads to a great trouble. This newly proposed glass pane holder has, in addition to its prior function that it is mounted on the lower portion of the glass pane to connect the glass pane and the window regulator mechanism, a function that is slidably engaged with a guide member provided interiorly of an automobile door to ensure a smooth movement of the glass pane when the latter is moved up and down. To this end, the prior art device is provided with a driven member which is slidably engaged with a guide member interiorly of the door. The problem remained for settlement is the adhesive forcibly moved from the end of the slot forms the useless rises on the driven member, as a consequence of which the driven member cannot be smoothly engaged with the guide member within the door.

SUMMARY OF THE INVENTION

It is an object of the present invention to provide a glass pane holder having an anti-flow member, which member prevents, when a slot is filled with an unhardened resin and a lower portion of a glass pane is inserted into the slot, the unhardened fluid adhesive from being extruded from the end of the slot.

It is a further object of the present invention to provide a method for mounting on a glass pane a glass pane holder having an anti-flow member as described above.

In accordance with the present invention, there is provided a glass pane holder comprising a pair of opposed side walls defining a slot having an open end for receiving an end of a glass pane and a bottom, said slot being adapted to form a clearance between said glass pane and said side walls when receiving the glass pane, said clearance receiving therein an adhesive, improvement wherein said opposed side walls include a portion in engagement with an anti-flow member inserted into said slot so as to close at least one end of said slot, said bottom has a hole having a volume enough to receive said anti-flow member, an unhardened fluid adhesive filled within said slot is retained within said slot by said anti-flow member, and said anti-flow member escapes into said hole upon ingress of said glass pane into said slot.

According to a preferred embodiment of the present invention, the anti-flow member comprises a columnar member like a rod or a tube having a length substantially equal to a height of the slot. This anti-flow member is inserted into the slot along a guide groove formed in the opposed side walls to act as a dam which closes one end of the slot. Since the fluid adhesive within the slot applies pressure to the anti-flow member upon ingress of the glass pane into the slot, the anti-flow member is preferably supported so as not to be moved laterally by engagement with the opposed side walls. In this case, preferably the anti-flow member is made in frictional engagement between the side walls so that in the normal state, it will not fall into the hole provided in the bottom of the slot and may be moved downward as the glass pane moves. The anti-flow member can be formed of either rigid material or a flexible material, and can be of either square or circle in sectional shape. The anti-flow member can be attached to either one end or both ends of the slot. In the glass pane holder provided with a driven member slidably engaged with a guide member within the door, the driven member is formed on one side portion. Therefore, in case of such a holder, the anti-flow member is attached to one end of the slot on the side closer to the driven member in order to prevent the unhardened adhesive from flowing on the driven member.

DESCRIPTION OF THE PREFERRED EMBODIMENTS

Figure 1:
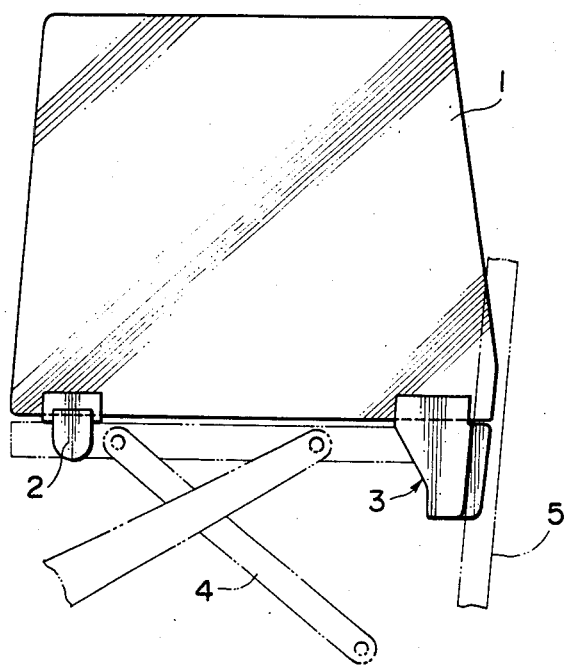
FIG. 1 is a front view showing a simplified construction of an automobile window on which a glass pane holder according to the present invention is mounted.

Referring now to FIG. 1, a glass pane 1 is supported by a set of holders 2 and 3 and connected to a known window regulator mechanism 4 through these holders 2 and 3. While in this case, the regulator mechanism 4 is shown in the form of a link or lever, it is to be noted that this configuration is a mere example and may be in the form of a known mechanism, for example, such as a push-pull cable, a belt or the like. One glass pane holder 2 out of the set of holders merely supports the glass pane 1, whereas the other holder 3 supports the glass pane 1 and also serves as a guide to assure the lifting and lowering of the glass pane 1, which holder 3 is therefore engaged with a guide rail 5 provided internally of the automobile door.

Figure 2:
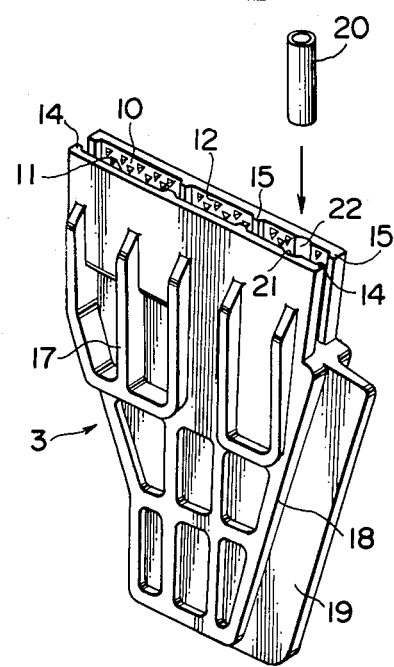
FIG. 2 is a perspective view of the glass pane holder shown in FIG. 1.
Figure 3:
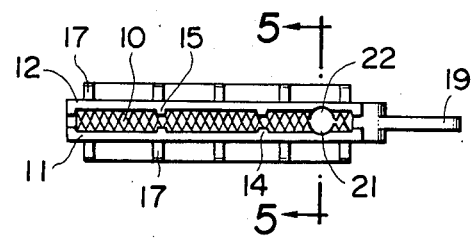
FIG. 3 is a top view of the glass pane holder shown in FIG. 2.
Figure 4:
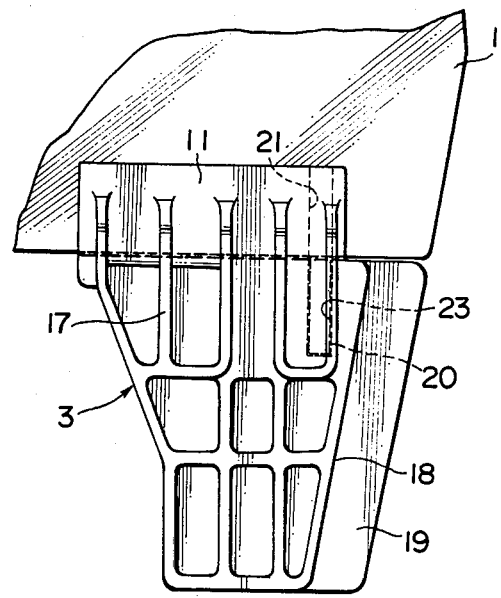
FIG. 4 is a front view of a holder mounted on the glass pane.
Figure 5:
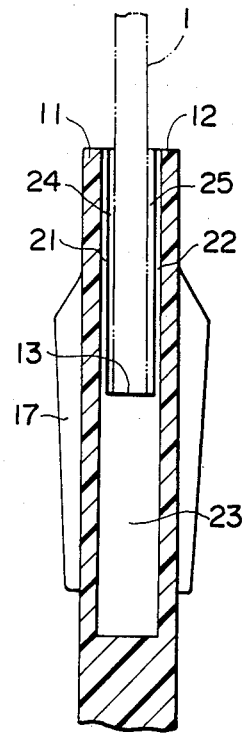
FIG. 5 is a sectional view taken along the line 5—5 of FIG. 3.

Turning to FIG. 2, a guide and glass pane holder 3 is formed of a hard synthetic resin and has a slot 10 having an open end defined by a pair of opposed side walls 11 and 12 and a bottom 13 (see FIG. 5). The side walls 11 and 12 are each formed on the inner surface with a plurality of ribs 14 and 15 which protrude toward the other wall each other, whereby when the glass pane 1 is received within the slot 10, the surfaces of the ribs 14 and 15 come into close contact with the glass pane, as a consequence of which is secured a clearance for receiving an adhesive between the glass pane 1 and the side walls 11 and 12. The side walls 11 and 12 are formed on their inner surfaces with small protuberances which define the adhesive surfaces. Both surfaces of the holder 3 are formed with a plurality of reinforcing ribs 17, and one end 18 thereof is formed with a driven member 19 slidably engaged with a guide rail (FIG. 1) provided internally of the automobile door. It is noted that connecting means between the holder 3 and the window regulator mechanism 4 (FIG. 1) is not illustrated but such connecting means forms no important part of the present invention and will be obvious from reading of the aforementioned U.S. Pat. No. 4,026,088.

Mounting of the holder 3 on the glass pane 1 is carried out by filling the slot 10 of the holder 3 with the unhardened adhesives and subsequently inserting the glass pane 1 into the slot 10. In this case, according to the present invention, an anti-flow member 20 is inserted into the slot 10, prior to the filling of the adhesive, so as to close at least one end of the slot 10 having an open end. This anti-flow member 20 can be of, for example, a synthetic resin tube. For guiding the insertion of the tube 20 into the slot 10, the opposed side walls 11 and 12 are formed with shallow guide grooves 21 and 22 so that the tube 20 comes into frictional engagement with both the guide grooves 21 and 22 and thereby the tube 20 is temporarily supported within the slot 10.

Referring to FIG. 5, the slot 10 has a bottom 13 formed with a hole 23 along an extension line of the guide grooves 21 and 22, the hole 23 having a volume enough to allow reception of the anti-flow tube 20. The anti-flow member 20 is mounted and an unhardened adhesive is then filled into the slot 10, after which the glass pane 1 is inserted into the slot 10. Then, the adhesive is guided to clearances 24 and 25 between the glass pane 1 and the side walls 11 and 12 without being extruded from the end of the slot 10 beyond the anti-flow member 20. In this case, the anti-flow member 20 escapes into the hole 23 formed in the bottom 13 of the slot 10 upon ingress of the glass pane 1 into the slot 10. Therefore the anti-flow member 20 never obstructs reception of the glass pane 1 into the slot 10. After the anti-flow member 20 has escaped, the adhesives are likewise guided into the guide grooves 21 and 22. Since it is possible to prevent the unhardened adhesive from being extruded from the end of the slot 10, avoidance of trouble such as formation of useless rises or protuberances on the driven member 19 resulting from the outflow adhesive is achieved.

While in the foregoing, the preferred embodiments of the present invention have been described in detail, these comprise mere illustrations and the present invention is not restricted thereby but changes and modifications of the present invention may be made. For example, a change of arrangement may be made so that the guide grooves 21 and 22 engaged with the anit-flow member 20 are not provided, and among the plurality of ribs 14 and 15 formed on the side walls 11 and 12, the rib positioned at one end of the slot 10 may come into engagement with the anti-flow member 20.

What is claimed is:

1. A glass pane holder comprising a pair of opposed side walls defining a slot having an open end for receiving an end of a glass pane and a bottom, said slot being adapted to form a clearance between said glass pane and said side walls when receiving the glass pane, said clearance receiving therein an adhesive, improvement wherein said opposed side walls include a portion in engagement with an anti-flow member inserted into said slot so as to close at least one end of said slot, said bottom has a hole having a volume enough to receive said anti-flow member, an unhardened fluid adhesive filled within said slot is retained within said slot by said anti-flow member, and said anti-flow member escapes into said hole upon ingress of said glass pane into said slot.

2. The glass holder according to claim 1, wherein said anti-flow member comprises a columnar member having a length substantially equal to a height of said slot, the engaging portions of said opposed side walls are defined by guide grooves in frictional contact with said columnar member, and said hole is connected to said guide grooves and has a depth and a sectional area capable of receiving therein said columnar member.

3. A method for mounting a glass holder, said holder comprising a pair of opposed side walls and a bottom which define a slot having an open end for receiving an end of said glass pane with a clearance, said opposed side walls including a portion engaged with an anti-flow member inserted into said slot so as to close at least one end of said slot, said bottom having a hole having a volume enough to receive said anti-flow member, said method comprising the steps of:
 a. inserting said anti-flow member into at least one end of said slot to bring said anti-flow member into engagement with the engaging portions of said opposed side walls;
 b. introducing an unhardened fluid adhesive into said slot; and
 c. inserting the end of said glass pane into said slot, and by said inserting operation, guiding said adhesive to the clearance between said side walls while said anti-flow member escapes into said hole.

* * * * *